(12) United States Patent
Hansen et al.

(10) Patent No.: US 11,762,866 B1
(45) Date of Patent: Sep. 19, 2023

(54) ENHANCED SEARCH RESULT RELEVANCY FOR INFORMATION RETRIEVAL SYSTEMS

(71) Applicant: Wells Fargo Bank, N.A., San Francisco, CA (US)

(72) Inventors: Carter C. Hansen, Huntersville, NC (US); Christian P. Krobisch, Charlotte, NC (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

(21) Appl. No.: 18/152,272

(22) Filed: Jan. 10, 2023

Related U.S. Application Data

(63) Continuation of application No. 17/644,481, filed on Dec. 15, 2021, now Pat. No. 11,580,121, which is a continuation of application No. 16/946,800, filed on Jul. 7, 2020, now Pat. No. 11,232,112, which is a continuation of application No. 14/952,504, filed on Nov. 25, 2015, now Pat. No. 10,726,020.

(51) Int. Cl.
| | |
|---|---|
| *G06F 16/00* | (2019.01) |
| *G06F 16/2457* | (2019.01) |
| *G06F 16/245* | (2019.01) |
| *G06F 16/248* | (2019.01) |

(52) U.S. Cl.
CPC ...... *G06F 16/24578* (2019.01); *G06F 16/245* (2019.01); *G06F 16/248* (2019.01)

(58) Field of Classification Search
CPC ................................................. G06F 16/24578
See application file for complete search history.

(56) References Cited

U.S. PATENT DOCUMENTS

| | | |
|---|---|---|
| 10,726,020 B1 | 7/2020 | Hansen et al. |
| 11,205,044 B1 * | 12/2021 | Neervannan ......... G06Q 10/067 |
| 11,232,112 B2 | 1/2022 | Hansen et al. |
| 2007/0061303 A1 | 3/2007 | Ramer et al. |
| 2010/0262454 A1 | 10/2010 | Sommer et al. |
| 2014/0193087 A1 | 7/2014 | Conwell |
| 2020/0341993 A1 | 10/2020 | Hansen et al. |

OTHER PUBLICATIONS

"U.S. Appl. No. 14/952,504, Examiner Interview Summary dated Apr. 8, 2020".
"U.S. Appl. No. 14/952,504, Non Final Office Action dated Aug. 9, 2019".
"U.S. Appl. No. 14/952,504, Notice of Allowance dated Mar. 23, 2020", 7 pgs.
"U.S. Appl. No. 14/952,504, Response filed Dec. 9, 2019 to Non Final Office Action dated Aug. 9, 2019", 9 pgs.
"U.S. Appl. No. 16/946,800, Notice of Allowance dated Sep. 17, 2021", 9 pgs.
"U.S. Appl. No. 17/644,481, Notice of Allowance dated Oct. 18, 2022", 8 pgs.

\* cited by examiner

*Primary Examiner* — Ajith Jacob
(74) *Attorney, Agent, or Firm* — SCHWEGMAN LUNDBERG & WOESSNER, P.A.

(57) ABSTRACT

Disclosed in some examples are methods, systems, and machine readable mediums which utilize volume to improve the ordering of search results for various information retrieval systems. This improves relevance as volume is a proxy for interest. As volume changes over time, the relevance of a particular result to a particular search query will increase or decrease over time.

20 Claims, 3 Drawing Sheets

ENHANCED SEARCH RESULT RELEVANCY FOR INFORMATION RETRIEVAL SYSTEMS

CROSS-REFERENCE TO RELATED APPLICATION

This application is a continuation of U.S. patent application Ser. No. 17/644,481, filed Dec. 15, 2021, which is a continuation of U.S. patent application Ser. No. 16/946,800, filed Jul. 7, 2020, now issued as U.S. Pat. No. 11,232,112, which is a continuation of U.S. patent application Ser. No. 14/952,504, filed Nov. 25, 2015, now issued as U.S. Pat. No. 10,726,020, each of which are incorporated by reference herein in their entirety.

TECHNICAL FIELD

Embodiments pertain to improved information retrieval. Some embodiments relate to ordering information retrieval results based upon information about volume.

BACKGROUND

Information retrieval systems offer ways for individuals to quickly and accurately find the information they desire. These systems retrieve data from large data sets and present results to users.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
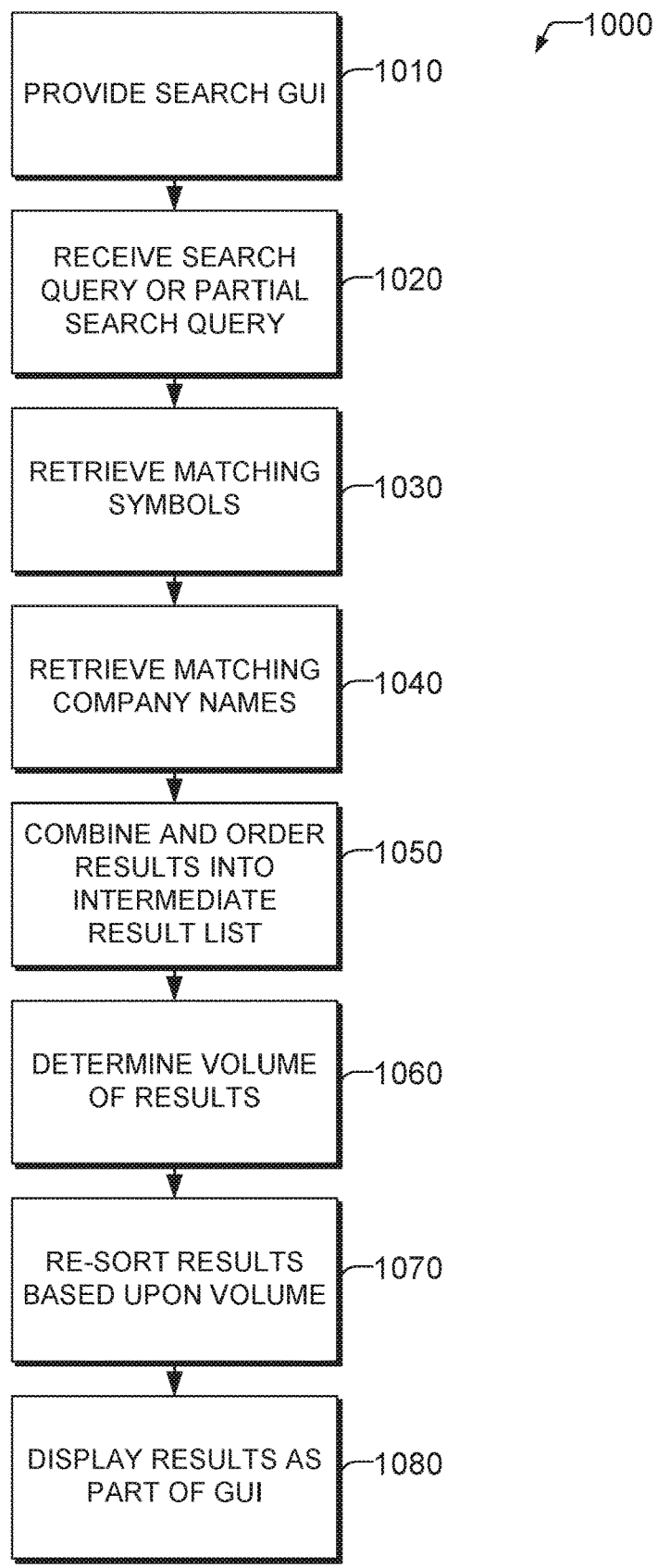
FIG. 1 shows a flowchart of a method of providing improved relevance for information retrieval systems according to some examples of the present disclosure.

Information retrieval systems provide search functionality that returns information that matches search queries. Typically the information is presented in order of most relevant results to least relevant results. Relevance may be measured in many ways depending on the information system, the interests of the searcher, and the like. The persistent challenge for information retrieval systems is finding better ways to deliver the most relevant information to users.

One example information retrieval system is a financial information retrieval system that retrieves information about a company's stock performance. These systems usually operate based upon a search string which is input into one or more graphical user interfaces by a user. These information retrieval systems match the search string against ticker symbols corresponding to a plurality of publicly traded companies. The search results may be shown after the user indicates they are finished entering the query, or continuously as the user enters or changes the search query.

If the user selects one of the presented results, the information retrieval system may present information about the corresponding stock or news about the company. These systems however may not deliver the most relevant and contextual results. For example, entering "M" into the search box of a financial information retrieval system is likely to yield results for Macy's, Moody's, and finally Microsoft. Because Macy's stock symbol is an "M," it is listed first, with Moody's second and Microsoft third. This is because the information retrieval systems are basing their measure of relevance upon only how closely the search string query matches the results. The stock symbol "M" for Macy's exactly matches the "M" search query and thus it is listed first. While analysis of how closely the characters entered by the user in the search query matches a result does provide some relevance to what users are searching for, it does not provide a complete picture.

Disclosed in some examples are methods, systems, and machine readable mediums which utilize volume to improve the relevance based ordering of search results for financial information retrieval systems. In some examples, the volume is a metric corresponding to the buying or selling of a financial instrument. The volume may not, in some examples, be directly related to past search queries. In some examples, volume includes trading, bid, ask, or quote volume of a financial instrument (e.g., a stock). Thus, in this system, according to some implementations, Microsoft may be sorted ahead of both Macy's and Moody's as Microsoft typically has more volume than Macy's and Moody's. This proceeds from the observation that volume is a direct measure of interest in the stock. High volume means that investors are already interested in the company, and additional investors are likely to be interested in the company as well. Notably, this means that a stock's position in a search result list for the same search may change often. This also means that the relevance of a particular company to a particular query may rise and fall over time.

Turning now to FIG. 1, a flowchart of a method 1000 of providing improved relevance for financial information retrieval systems is shown according to some examples of the present disclosure. At operation 1010 the financial information retrieval system may provide a graphical user interface (GUI) for a user to enter a search query. The GUI may include one or more web pages sent to the user, a GUI that is part of an application (e.g., a mobile app), and the like. The GUI may include one or more input boxes, including a search query input box.

At operation 1020 the system receives the search query or partial search query from a computing device of the user. In some examples, the method operates on partial search queries, providing results as the user types. In this case, the system will execute operations 1020-1080 periodically as the user enters the search query. For example, every change in the entered search query by the user in the search query input box may trigger a new search and a new display of search results. In other examples, the system may wait for the user to indicate they are done entering their search. For example, depressing the <ENTER> key, clicking a mouse, moving the application focus away from the search query input box, and the like.

At operation 1030 the system retrieves stock trading symbols from a database of stock trading symbols that either fully or partially match the search query. The search may be conducted using a number of matching techniques. One example technique includes comparing the search query against all the symbols in the symbol data store and generating a Levenshtein score. The Levenshtein distance scores the (query, symbol) input pair based upon the number of single character edits to convert the symbol into an exact match of the search query. The fewer edits necessary, the closer the match. Additionally, results in which the search query matches the beginning of a symbol may be ordered higher than results in which the search query matches the middle or end of a symbol. In some examples, to incorporate this concept into the Levenshtein algorithm, changes at the beginning of the query are made more costly than changes at the end or the middle. Thus differences in the query and the stock symbol at the beginning decrease the strength of the match more than differences in the middle or end, In some examples, the result list from this search may be ordered based upon the Levenshtein score, with results that are considered better matches ordered first. Other example search algorithms may be used, such as a Boyer-Moore string search algorithm, the Jaro-Winkler distance algorithm, inverted indices, other fuzzy string searching algorithms, and other searching algorithms. These other example search algorithms may produce scores which may be utilized similar to the way the Levenshtein scores are. If these other do not produce similarity scores, the matching strings these search algorithms produce may be run through the Levenshtein or similar algorithm to produce a matching score.

At operation 1040 the system retrieves matching company names from a database of company names and information that either fully or partially match the search query. The search may be conducted using a number of matching techniques. One example technique includes comparing the search query against all the company names in the company name data store and generating a Levenshtein score. The Levenshtein distance scores the (query, company name) input pair based upon the number of single character edits to convert the company name into an exact match of the search query. The fewer edits necessary, the closer the match. Additionally, results in which the search query matches the beginning of a company name may be ordered higher than results in which the search query matches the middle or end of a company name. In some examples, to incorporate this concept into the Levenshtein algorithm, changes at the beginning of the query are made more costly than changes at the end or the middle. Thus differences in the query and the company name at the beginning decrease the strength of the match more than differences in the middle or end. In some examples, the result list from this search may be ordered based upon the Levenshtein score, with results that are considered better matches ordered first. Other example search algorithms may be used, such as a Boyer-Moore string search algorithm, the Jaro-Winkler distance algorithm, inverted indices, other fuzzy string searching algorithms, and other searching algorithms. These other example search algorithms may produce scores which may be utilized similar to the way the Levenshtein scores are. If these other do not produce similarity scores, the matching strings these search algorithms produce may be run through the Levenshtein or similar algorithm to produce a matching score.

At operation 1050 the results of the symbol retrieval and the company name retrieval are combined and ordered to create an intermediate result list. Results may be ordered based upon their matching scores, with those that score better sorted first. Further refinement may be done as well. For example, matching symbols may be given higher over matching company names when the search string is short (e.g., 1-4 characters) and matching company names may be ordered higher over matching symbols when the search string is longer (e.g., 5 or more characters). This may be accomplished by multiplying the matching scores by a weight dependent on the search string size and the result type. For example, if the search string is 2 characters, the matching scores for symbols may be adjusted (e.g., multiplied) by a predetermined factor (e.g., 1.2) to increase the relevance of the symbol matches, while the company name matches may not be changed. Likewise, if the string is 6 characters, the matching company names may be adjusted (e.g., multiplied) by a predetermined factor (e.g., 1.2) to increase the relevance of company name matches, while the symbol matches may not change. Other various refinements may be utilized. For example, search results from company names and matching symbols that refer to the same company may also be de-duplicated. Finally, results that feature non-standard shares or offerings of a company may be moved to the back or removed altogether. This may be accomplished by using a predetermined list of non-standard shares or offerings.

Additionally, the intermediate results list may be pruned to include only the most relevant results. In some examples, the results whose matching scores do not exceed a predetermined threshold may be removed from the list. In other examples, only a predetermined number X of results is desired. The X results with the top matching scores may be selected and the other results may be removed from the list. In still other examples, a predetermined percentage Y % of results may be desired, The Y % of results with the top matching scores may be selected and the other results may be removed from the list.

At operation 1060 the volume of the companies in the intermediate results list are determined. This may be done by contacting a database such as a database operated by a stock exchange, a financial information server, or the like. This may be done on-demand and in real-time, but in other examples, this data may be determined hourly, daily, weekly, monthly, or the like and stored in a local database for easy access. In some examples, the volume referred to is the trading volume—the amount of a security corresponding to a company that is traded during a given period of time (typically a day). In other examples, the volume may be quote volume, the number of price quotes submitted by traders during a given period of time (typically a day).

At operation 1070 the intermediate results may be re-sorted based upon the volume information determined in operation 1060. In some examples, the intermediate results list may be resorted solely on the basis of volume with the largest volume being given the highest position (e.g., the most relevant—and thus displayed first or on top of the search result list). In other examples, the matching scores may be adjusted (e.g., multiplied) by a weighting factor corresponding to their volume to produce a volume weighted matching score. For example, a volume weighting factor may be determined by a formula that increases the weighting applied to the matching score as the corresponding volume increases. The formula may be linear, quadratic, cubic, or the like. In other examples, a table may be utilized that has predetermined weightings based upon predetermined ranges of volume. After the scores are adjusted, the intermediate result list is re-sorted based upon the volume weighted matching scores, or as noted, in some examples based upon only the volume. This re-sorted list is the final result list.

At operation 1080, the final result list is displayed to the user in order based upon the re-sorted final result list. If the results are being presented as search suggestions, the result lists may be displayed as a set of search suggestions (e.g., below the search query input box). In other examples where the search query is complete, the results may be shown in a GUI presenting the search results. When displaying the results, those results are ordered such that the companies with the highest volume are shown first, or in other examples, the highest volume weighted matching score.

While the above disclosure described searches for two different types of information (company names and symbols)—other types of information about an organization or company may also be searched in addition to, or instead of the company names and symbols. Further, in some examples, rather than combine the results for company names and symbols in operation 1050, the search result lists may be kept separate. Operations 1060-1070 may then re-sort each separate search result list based upon volume as previously disclosed. Both sorted search result lists may be separately displayed to the user at operation 1080. In other examples, prior to operation 1080, the separate (and sorted) lists may be merged, as at operation 1050.

Figure 2:
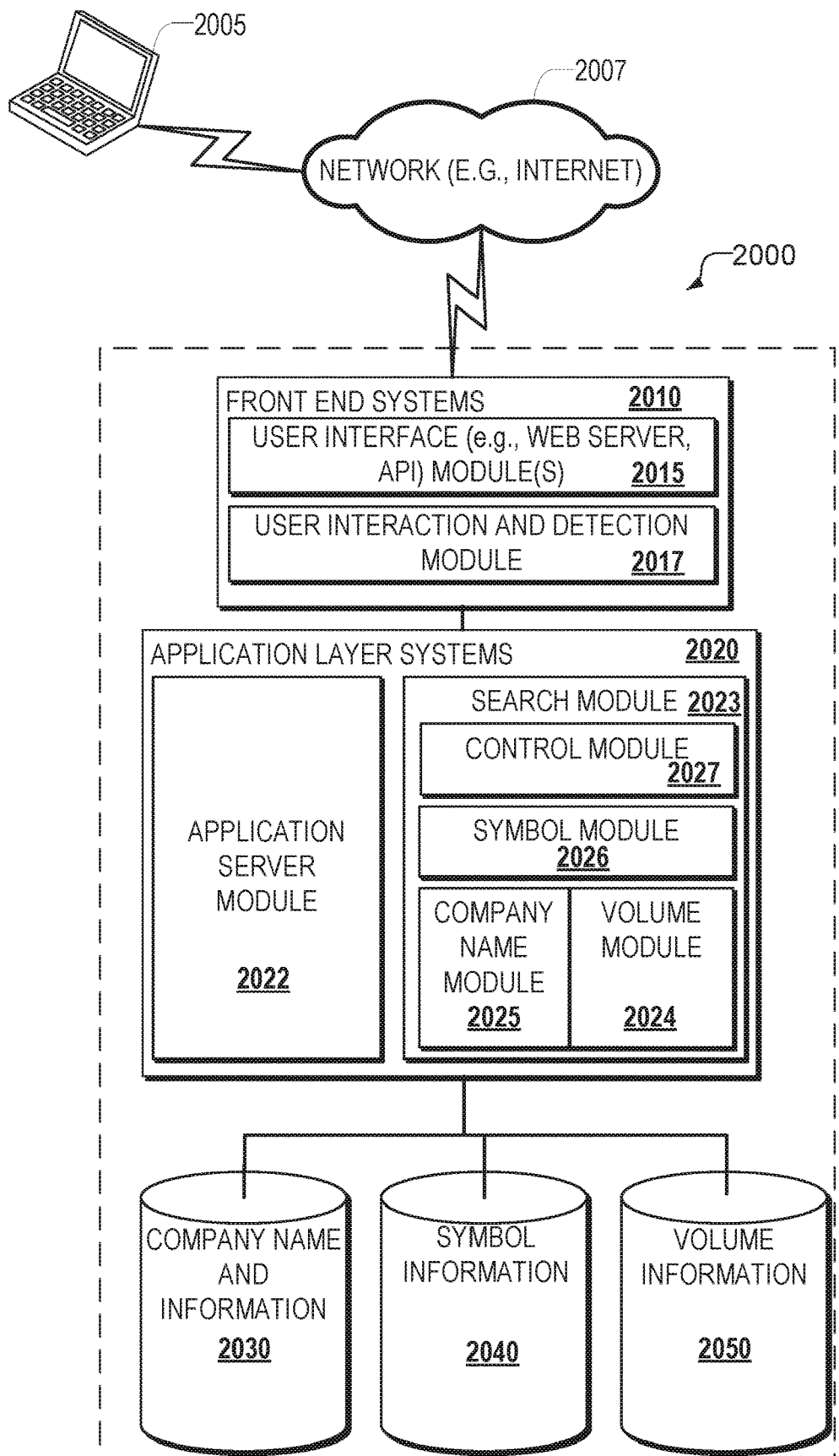
FIG. 2 shows an example schematic of an information retrieval system according to some examples of the present disclosure.

Turning now to FIG. 2, an example schematic of an information retrieval system for retrieving financial information 2000 is shown. As shown in FIG. 2, the financial information retrieval system may contain one or more systems, such as front end systems 2010, and application layer systems 2020. Financial information retrieval system 2000 may also include various data stores. Company name and information store 2030 stores company names and information about those companies (e.g., including stock prices and statistics). Symbol information store 2040 stores symbol information correlating a stock trading symbol to one or more companies corresponding to the company name and information store 2030. Volume information store 2050 may store trading or quote volume information of the companies stored in company name and information store 2030. Each system may execute on independent computing devices or may execute on the same computing devices. Front end systems 2010, application layer systems 2020 and the data stores 2030 and 2040 may be communicatively coupled to each other.

Front end systems 2010 may comprise a user interface module (e.g., a web server) 2015, which receives requests (e.g., search queries) from various client-computing devices (such as client device 2005) over a network, such as network 2007, and communicates appropriate responses to the requesting client devices. For example, the user interface modules) 2015 may receive requests in the form of Hypertext Transport Protocol (HTTP) requests, or other network-based, application programming interface (API) requests (e.g., from a dedicated application running on a client device). In addition, a user interaction and detection module 2017 may be provided to detect various interactions that users have with different applications, services and content presented. For example, the user interaction and detection module 2017 may determine and save contextual information of the user.

Application layer systems 2020 may include one or more various application server modules 2022, which, in conjunction with the user interface module(s) 2015, generate various graphical user interfaces (e.g., web pages) with data retrieved from various data sources. With some embodiments, application server module 2022 is used to implement the functionality associated with various applications and/or services provided by the financial information retrieval system. Example functionality includes security (authenticating users), providing financial information as part of a graphical user interface, executing financial transactions (balance transfers, financial transfers), closing accounts, opening accounts, setting financial goals, determining interest rates, searching for financial information, and the like.

Application layer systems 2020 may also include a search module 2023 which may implement the operations of FIG. 1. Search module 2023 may include control module 2027, symbol module 2026, company name module 2025 and volume module 2024. Control module 2027 may coordinate with the user interface modules 2015 to provide a search interface for users to input a search query. For example, the search interface may be part of a graphical user interface. The control module 2027 may provide a search query input element, such as an input box. The user may then enter a search query which is transmitted in whole or in part (in the case of search suggestions) to the control module 2027 (e.g., through user interaction and detection module 2017). Control module 2027 sends the search query to the company name module 2025 and the symbol module 2026 (in some examples, simultaneously). The company name module 2025 searches the company name and information store 2030 for matches between the company names and the search query (or partial search query). As explained previously, returned results may then be ordered according to matching scores which describe how closely the search query (or partial search query) matches the company name. The ordered results are then sent back to the control module 2027.

Similarly, the symbol module 2026 searches the symbol information store 2040 for matches between the symbols and the search query (or partial search query). As explained previously, returned results may then be ordered according to matching scores which describe how closely the search query (or partial search query) matches the symbol. The ordered results are then sent back to the control module 2027.

Once control module 2027 receives the results from the company name module 2025 and volume module 2024, the control module may combine and order the results into the intermediate result list. As previously explained this may involve determining how to combine the different result lists (e.g., using the matching score, and removing duplicate entries) and in sonic examples, adjusting the ordering (e.g., based upon search query size.) Control module 2027 then contacts volume module 2024 to obtain volume information for the companies represented by the company names and symbols. Volume module 2024 contacts volume information store 2050 to obtain the volume information for the companies. This information is then sent back to the control module 2027. Control module 2027 may then use this information to updated the ordering of the intermediate results list into the final results list. The control module 2027 may then work with the user interface modules 2015 to present the results lists to the user in the determined order.

Symbol module 2026, company name module 2025, and volume module 2024 are responsible for updating and maintaining the company name and information store 2030, symbol information store, and volume information store respectively. For example, the volume module 2024 may update the trading or quote volume information every hour, day, week, or the like, In other examples, the data stores 2030-2050 may be external to the system 2000. For example, these data stores may be associated with one or more stock exchanges and may be updated in real time as trading is ongoing. In other examples, they may be associated with one or more market reporting or aggregating companies or tools.

While the company name and information store 2030, symbol information store 2040, and volume information store 2050 are shown as separate data stores, in some examples, other configurations are possible. For example, one or more of the company name and information store 2030, symbol information store 2040, and volume information store 2050 may be stored in the same data store. Likewise, while the various modules shown in FIG. 2 are separated for easy description, one or more of the various modules shown in FIG. 2 may be implemented together.

While the system shown in FIG. 2 is a client-server system, in other examples, one or more of the ordering functions (e.g., ordering based upon trading or quote volume) may be a client based application. For example, the client may have code that performs the ordering. In some examples, the application may re-order financial search results based upon volume from a variety of financial search engines. For example, the code may be a browser plug-in that recognizes a financial information search and then reorganizes the search results based upon volume.

With some embodiments, the financial information retrieval system 2000 provides an application programming interface (API) module with the front end systems 2010 via which applications and services can access various data and services provided or maintained by the financial information retrieval system 2000. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the financial information retrieval system 2000.

While the foregoing has focused on financial information systems, the disclosure is not so limited. This disclosure is relevant to any information system where a volume affects the relevance of an item of information. Examples of other applications include retail information systems (e.g., the volume of items sold), internet searching (e.g., the volume of page accesses of the search results), and the like.

Figure 3:
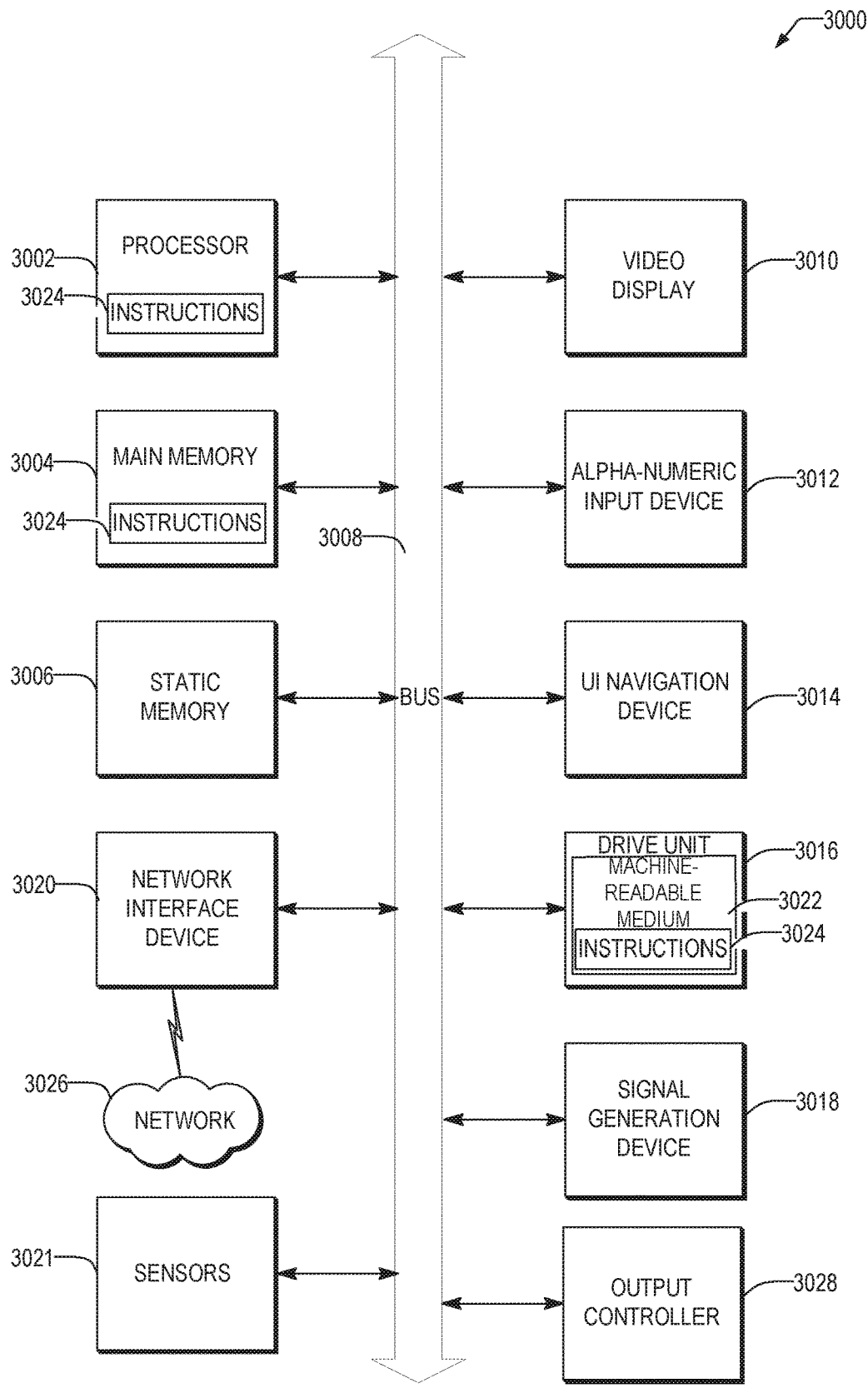
FIG. 3 is a block diagram illustrating an example of a machine upon which one or more embodiments may be implemented.

FIG. 3 illustrates a block diagram of an example machine 3000 upon which any one or more of the techniques (e.g., methodologies) discussed herein may perform. In alternative embodiments, the machine 3000 may operate as a standalone device or may be connected (e.g., networked) to other machines. In a networked deployment, the machine 3000 may operate in the capacity of a server machine, a client machine, or both in server-client network environments. In an example, the machine 3000 may act as a peer machine in peer-to-peer (P2P) (or other distributed) network environment. The machine 3000 may be a server, a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. For example, machine 3000 may execute one or more of the components of FIG. 2. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein, Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 3000 may include a hardware processor 3002 (e.g., a central processing unit (CPU), a graphics processing unit (GPU), a hardware processor core, or any combination thereof), a main memory 3004 and a static memory 3006, some or all of which may communicate with each other via an interlink (e.g., bus) 3008. The machine 3000 may further include a display unit 3010, an alphanumeric input device 3012 (e.g., a keyboard), and a user interface (UI) navigation device 3014 (e.g., a mouse). In an example, the display unit 3010, input device 3012 and UI navigation device 3014 may be a touch screen display. The machine 3000 may additionally include a storage device (e.g., drive unit) 3016, a signal generation device 3018 (e.g., a speaker), a network interface device 3020, and one or more sensors 3021, such as a global positioning system (GPS) sensor, compass, accelerometer, or other sensor. The machine 3000 may include an output controller 3028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.

The storage device 3016 may include a machine readable medium 3022 on which is stored one or more sets of data structures or instructions 3024 (e.g., software) embodying or utilized by any one or more of the techniques or functions described herein. The instructions 3024 may also reside, completely or at least partially, within the main memory 3004, within static memory 3006, or within the hardware processor 3002 during execution thereof by the machine 3000. In an example, one or any combination of the hardware processor 3002, the main memory 3004, the static memory 3006, or the storage device 3016 may constitute machine readable media.

While the machine readable medium 3022 is illustrated as a single medium, the term "machine readable medium" may include a single medium or multiple media (e.g., a centralized or distributed database, and/or associated caches and servers) configured to store the one or more instructions 3024.

The term "machine readable medium" may include any medium that is capable of storing, encoding, or carrying instructions for execution by the machine 3000 and that cause the machine 3000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 3024 may further be transmitted or received over a communications network 3026 using a transmission medium via the network interface device 3020. The Machine 3000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 3020 may include one or more physical jacks (e.g., Ethernet, coaxial, or phone jacks) or one or more antennas to connect to the communications network 3026. In an example, the network interface device 3020 may include a plurality of antennas to wirelessly communicate using at least one of single-input multiple-output (SIMO), multiple-input multiple-output (MIMO), or multiple-input single-output (MISO) techniques. In some examples, the network interface device 3020 may wirelessly communicate using Multiple User MIMO techniques.

What is claimed is:

1. A method comprising:
using a hardware processor:
receiving a first subset of a search query entered into a graphical user interface as a user is still entering characters of the search query;
retrieving a first plurality of search results that at least partially match the first subset of the search query, each particular one of the first plurality of search results being either a stock symbol or a company name, each particular one of the first plurality of search results having a respective matching score that quantifies a strength of a match between the first subset of the search query and the particular one of the first plurality of search results;
weighting matching scores of each particular one of the search results based upon a number of characters in the first subset and a result type of the particular one of the search results, wherein stock symbol result types are weighted higher than company name result types when the number of characters in the first subset is below a threshold and wherein company name result types are weighted higher than stock symbol result types when the number of characters in the first subset is equal to or greater than the threshold;
determining a volume corresponding to each particular one of the first plurality of search results, the volume related to a buying or selling of a financial instrument corresponding to the particular one of the first plurality of search results;
ordering the first plurality of search results based at least in part upon the volume corresponding to each of the first plurality of search results and the weighted matching scores of the first plurality of search results;
deduplicating the first plurality of search results to remove one or more duplicates of search results that reference a same company to create a first plurality of deduplicated search results; and
providing the first plurality of deduplicated search results in the graphical user interface.

2. The method of claim 1, wherein the volume is a trading or quote volume of financial instruments corresponding to each of the first plurality of search results.

3. The method of claim 1, wherein the matching scores are a Levenshtein distance.

4. The method of claim 1, wherein determining the volume corresponding to each particular one of the first plurality of search results comprises accessing a cache of volume data obtained from a remote database prior to retrieving the first plurality of search results.

5. The method of claim 1, further comprising removing non-standard shares or offerings of a company from the first plurality of search results using a predetermined list of non-standard shares or offerings.

6. The method of claim 1, further comprising removing results from the first plurality of results whose matching scores do not exceed a specified threshold.

7. The method of claim 1, wherein the first subset of the search query is received from a computing device of a user over a network.

8. A computing device comprising:
a hardware processor;
a memory, storing instructions, which when executed by the hardware processor, causes the hardware processor to perform operations comprising:
receiving a first subset of a search query entered into a graphical user interface as a user is still entering characters of the search query;
retrieving a first plurality of search results that at least partially match the first subset of the search query, each particular one of the first plurality of search results being either a stock symbol or a company name, each particular one of the first plurality of search results having a respective matching score that quantifies a strength of a match between the first subset of the search query and the particular one of the first plurality of search results;
weighting matching scores of each particular one of the search results based upon a number of characters in the first subset and a result type of the particular one of the search results, wherein stock symbol result types are weighted higher than company name result types when the number of characters in the first subset is below a threshold and wherein company name result types are weighted higher than stock symbol result types when the number of characters in the first subset is equal to or greater than the threshold;

determining a volume corresponding to each particular one of the first plurality of search results, the volume related to a buying or selling of a financial instrument corresponding to the particular one of the first plurality of search results;

ordering the first plurality of search results based at least in part upon the volume corresponding to each of the first plurality of search results and the weighted matching scores of the first plurality of search results;

deduplicating the first plurality of search results to remove one or more duplicates of search results that reference a same company to create a first plurality of deduplicated search results; and providing the first plurality of deduplicated search results in the graphical user interface.

9. The computing device of claim 8, wherein the volume is a trading or quote volume of financial instruments corresponding to each of the first plurality of search results.

10. The computing device of claim 8, wherein the matching scores are a Levenshtein distance.

11. The computing device of claim 8, wherein the operations of determining the volume corresponding to each particular one of the first plurality of search results comprises accessing a cache of volume data obtained from a remote database prior to retrieving the first plurality of search results.

12. The computing device of claim 8, wherein the operations further comprise removing non-standard shares or offerings of a company from the first plurality of search results using a predetermined list of non-standard shares or offerings.

13. The computing device of claim 8, wherein the operations further comprise removing results from the first plurality of results whose matching scores do not exceed a specified threshold.

14. The computing device of claim 8, wherein the first subset of the search query is received from a computing device of a user over a network.

15. A non-transitory machine-readable medium, storing instructions, which when executed by a computing device, causes the computing device to perform operations comprising:

receiving a first subset of a search query entered into a graphical user interface as a user is still entering characters of the search query;

retrieving a first plurality of search results that at least partially match the first subset of the search query, each particular one of the first plurality of search results being either a stock symbol or a company name, each particular one of the first plurality of search results having a respective matching score that quantifies a strength of a match between the first subset of the search query and the particular one of the first plurality of search results;

weighting matching scores of each particular one of the search results based upon a number of characters in the first subset and a result type of the particular one of the search results, wherein stock symbol result types are weighted higher than company name result types when the number of characters in the first subset is below a threshold and wherein company name result types are weighted higher than stock symbol result types when the number of characters in the first subset is equal to or greater than the threshold;

determining a volume corresponding to each particular one of the first plurality of search results, the volume related to a buying or selling of a financial instrument corresponding to the particular one of the first plurality of search results;

ordering the first plurality of search results based at least in part upon the volume corresponding to each of the first plurality of search results and the weighted matching scores of the first plurality of search results;

deduplicating the first plurality of search results to remove one or more duplicates of search results that reference a same company to create a first plurality of deduplicated search results; and providing the first plurality of deduplicated search results in the graphical user interface.

16. The non-transitory machine-readable medium of claim 15, wherein the volume is a trading or quote volume of financial instruments corresponding to each of the first plurality of search results.

17. The non-transitory machine-readable medium of claim 15, wherein the matching scores are a Levenshtein distance.

18. The non-transitory machine-readable medium of claim 15, wherein the operations of determining the volume corresponding to each particular one of the first plurality of search results comprises accessing a cache of volume data obtained from a remote database prior to retrieving the first plurality of search results.

19. The non-transitory machine-readable medium of claim 15, wherein the operations further comprise removing non-standard shares or offerings of a company from the first plurality of search results using a predetermined list of non-standard shares or offerings.

20. The non-transitory machine-readable medium of claim 15, wherein the operations further comprise removing results from the first plurality of results whose matching scores do not exceed a specified threshold.

\* \* \* \* \*